Figure 1:
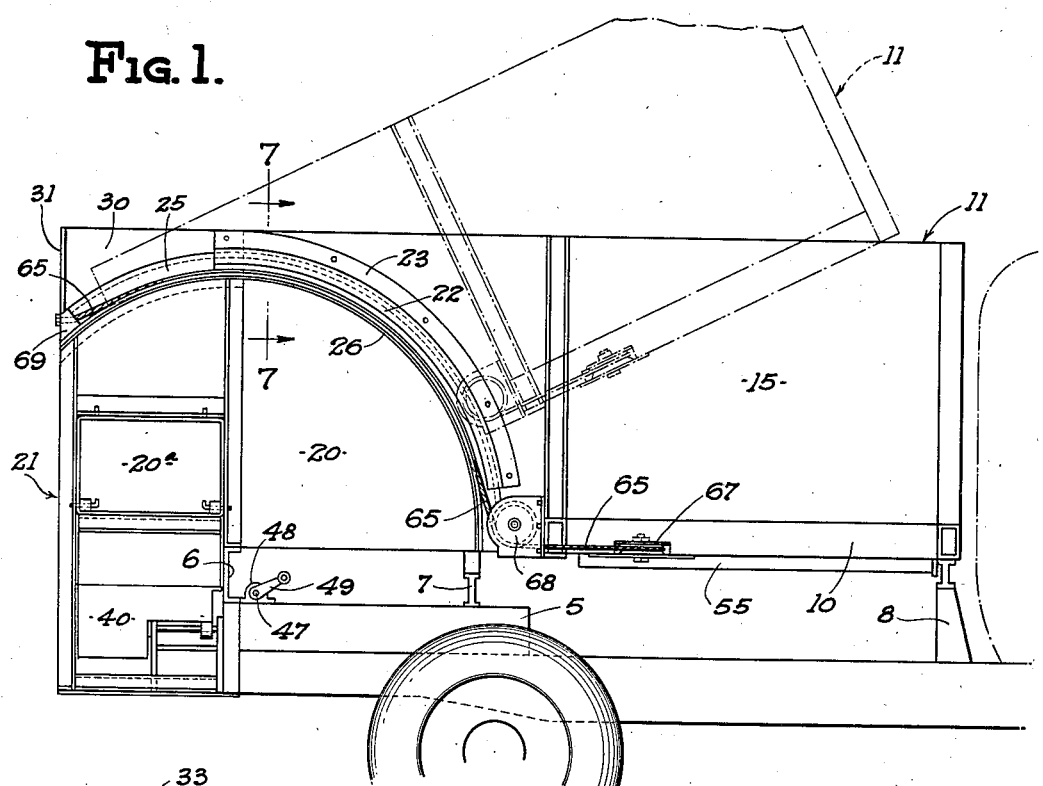

May 7, 1940.　　　I. S. MICK　　　2,199,507
DUMPING CONVEYANCE
Filed Nov. 7, 1938　　　3 Sheets-Sheet 1

INVENTOR.
IRA SCOTT MICK
BY
ATTORNEYS.

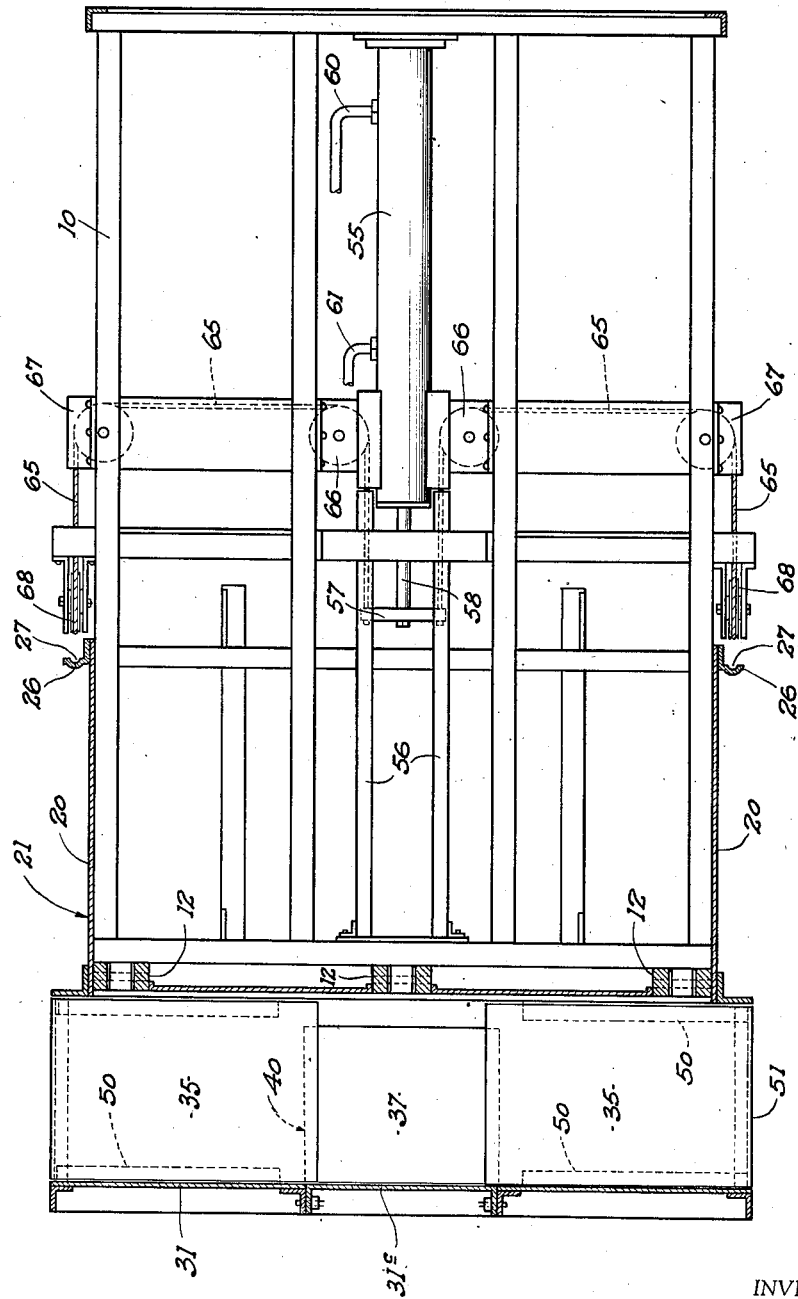

May 7, 1940.  I. S. MICK  2,199,507
DUMPING CONVEYANCE
Filed Nov. 7, 1938   3 Sheets-Sheet 3
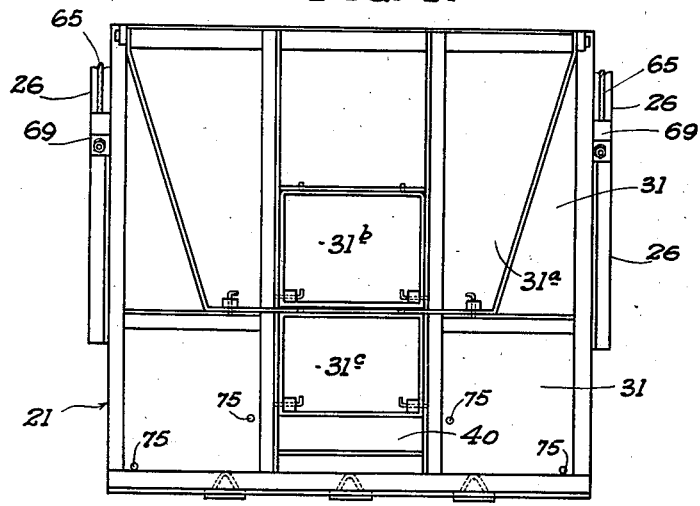
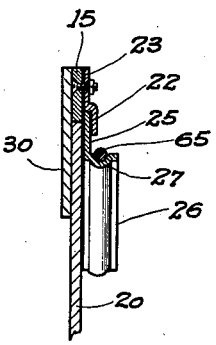
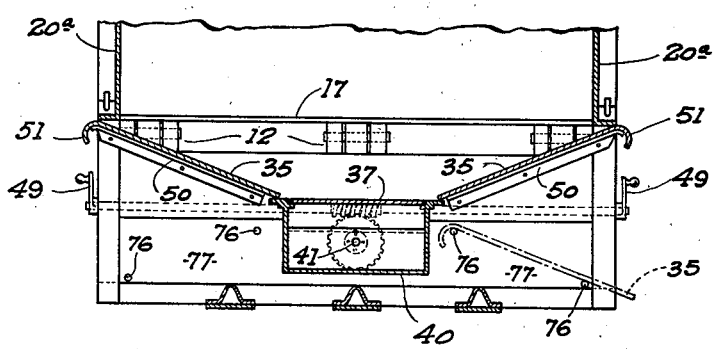
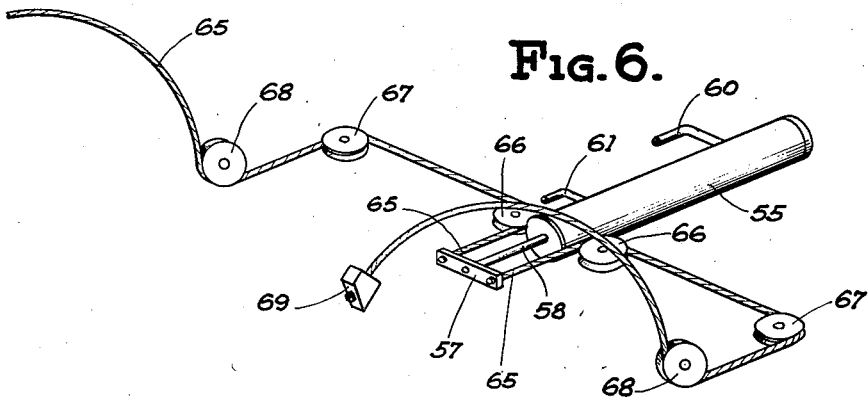
INVENTOR.
IRA SCOTT MICK
BY Hull, Brock & Wear
ATTORNEYS.

Patented May 7, 1940

2,199,507

UNITED STATES PATENT OFFICE 2,199,507

DUMPING CONVEYANCE

Ira Scott Mick, Cleveland, Ohio

Application November 7, 1938, Serial No. 239,275

11 Claims. (Cl. 298—7)

This invention relates to dumping conveyances or trucks for transporting and discharging coal and other lump, granular or comminuted material.

The broad purpose of the invention is to provide a conveyance of the above mentioned character incorporating a load carrying body that is pivoted adjacent its discharge end to the frame structure of the conveyance, and means adapted for adjustment to cause the load to be discharged in a selected one of a plurality of load delivering directions when the body is dumped. As an adjunct to the conveyance, a chute or apron conveyor may be employed for carrying the material away, the same being adapted to be arranged with its receiving end in a position to receive the material from the conveyance and its other end in a position to discharge the material into a bin or other receptacle or place of deposit.

More limitedly stated, a principal object of the invention is to provide a dumping conveyance wherein the load carrying body is constituted of a dumping section that is pivoted at one end to a part fixed with respect to the conveyance frame, and a second section that is stationary with respect to said part and in the bottom portion of which are incorporated load directing means adapted to be adjusted so as to deliver the load laterally in either direction or to the rear.

Another object is to provide, in a dumping conveyance of the character just described, a cradle situated in the lower central portion of the stationary section of the load carrying body, the same including a substantially flat top or platform along and upon the lateral edges of which bear the inner ends of plates or deflectors which, with said top or platform, provide a hopper-like bottom for said stationary section, said plates or deflectors being capable of individual removal or partial withdrawal to effect a discharge opening, mechanism being provided for rocking the cradle toward the discharge side, the plate or deflector opposite such side automatically adjusting itself to the new angular position of the cradle.

A further object of the invention is the provision, in a dumping conveyance, of a unique form of hoist for operating the dumping body, practically all parts of which are mounted on said body and move therewith.

A still further object is to provide a hoist for the dumping body of a conveyance of the above mentioned class wherein flexible tension elements, such as cables, have their dead ends anchored to parts fixed with respect to the conveyance frame, and are operatively engaged with guide means on the dumping body and are so connected to and acted upon by the power means of the hoist as to be taken in and thereby caused to lift the dumping body when the power means is energized.

A further and more specific object of the invention is to provide a dumping conveyance of the before mentioned class wherein the load carrying body comprises two sections, one the dumping section that is pivoted adjacent its discharge end to the frame structure of the conveyance, and a part stationary with respect to such frame structure, the corresponding side walls of the two sections lying in substantially the same plane and having contiguous arcuate edges concentric with the pivotal axis of the dumping section, the bottom portion of the stationary section having facilities for directing and discharging the material that constitutes the load. It is a further object of the invention to provide in a structure of the kind just described (including, in addition to the elements above enumerated, flanges that extend along and conform to the arcuate edges of the side walls of the stationary section) a hoist comprising a power cylinder that is carried by and beneath the bottom of the dumping section and encloses the usual piston to the rod of which is attached, through a cross head or other suitable unit, the inner ends of opposed flexible elements or cables that are engaged over guide means or sheaves carried by the dumping section and certain of which are disposed outwardly of the side walls thereof adjacent the lower forward ends, and in the planes, of the aforesaid flanges, the flexible elements or cables bearing upon and extending along said flanges to the upper rear ends thereof where said elements or cables are anchored; whereby, when pressure fluid is delivered to the cylinder, the piston will be advanced and the opposed flexible elements or cables taken in to cause the dumping section to be elevated.

Figure 2:
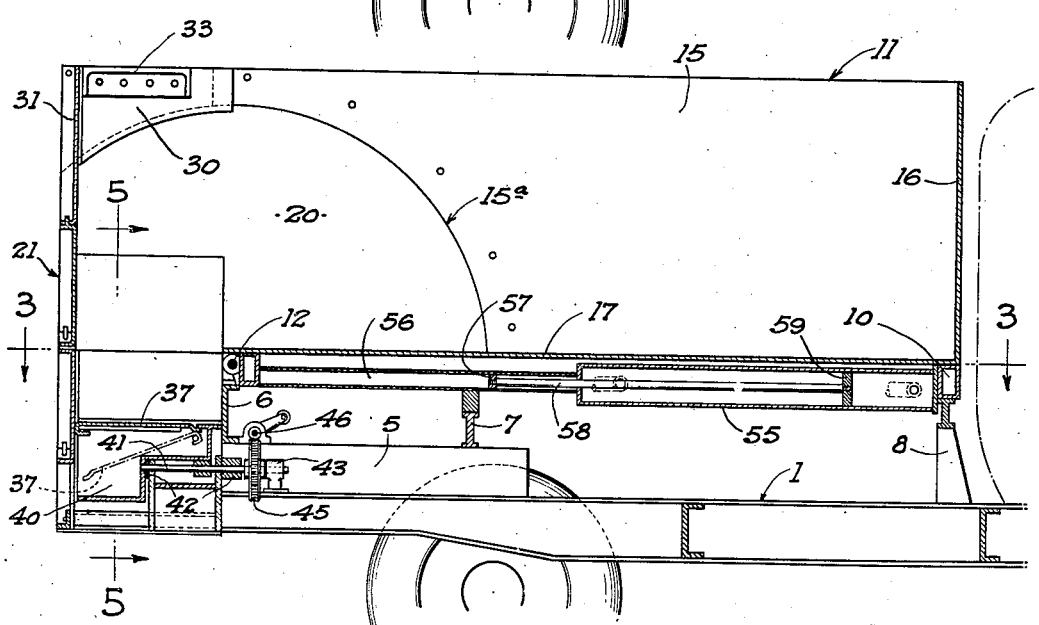

The foregoing objects, with others hereinafter appearing, are attained in the embodiment of the invention illustrated in the accompanying drawings wherein Fig. 1 is a fragmentary side elevation of a dumping conveyance incorporating my improvements; Fig. 2 is a central vertical section of the same; Fig. 3 is a sectional plan immediately below the bottom wall of the dumping section of the body, as indicated by the line 3—3 of Fig. 2; Fig. 4 is a rear elevation of the conveyance, wheels, etc. being omitted; Fig. 5 is a fragmentary sectional rear elevation, substantially on the line 5—5 of Fig. 2; Fig. 6 is a diagrammatic perspective view of the hoist involving the flexible elements or cables, sheaves, etc.; and Fig. 7 is a sectional detail on the line 7—7 of Fig. 1.

Mounted on the main frame or chassis 1 of the truck is a superstructure involving frame elements 5, 6, 7 and 8; and normally resting on the frame members 7 and 8 is the base frame 10 of the dumping body 11. The rear end of the frame 10 is pivotally connected, through hinges designated generally by 12, to the rear frame element 6 of the aforesaid superstructure.

The dumping body comprises side walls 15, a front wall 16 and a bottom wall 17, the latter extending rearwardly from the front wall to a position over the hinges 12; and the rear lower corners of the side walls 15 are cut away on arcs concentric with the pivotal axis of the hinges 12. The arcuate edges 15a of the side walls 15 are contiguous to the complementary curved edges of the segmental side walls 20 of a body section that is designated generally by the numeral 21 and is stationary with respect to the aforesaid superstructure mounted on the main frame or chassis 1. The walls 15 and 20 on each side of the conveyance are in the same plane, as best shown in the sectional detail of Fig. 7, and they are retained in this relation by the engagement of flanges 22 of arcuate Z-bars 23, that are bolted or otherwise secured to the walls 15, over the outwardly extending flanges 25 of segmental rails 26 that are fastened to the walls 20. The rails 26 extend laterally from the walls 20 and are curved on an arc concentric with the pivotal axis of the hinges 12, each rail being desirably formed with a longitudinal groove 27.

The spaces above the walls 20 rearwardly of the adjacent ends of the side walls 15 are closed by plates 30 that project forwardly from the upper corners of the rear wall 31 of the body section 21 and are held firmly in place by gussets 33 (Fig. 2). The rear wall 31 includes a relatively large hinged portion or door (shown at 31a in Fig. 4) which, in turn, includes a removable panel 31b. A similar panel 31c forms the central part of the lower portion of the wall 31.

The wall 31 is disposed in a vertical plane a substantial distance rearwardly of the rear edge of the bottom wall 17, and the space thus provided constitutes a hopper-like compartment. The bottom of this compartment comprises removable plates 35 that extend inwardly and downwardly from the sides of the body section 21 and bear along their inner edges upon a removable plate 37 that normally constitutes the top or platform of a so-called cradle 40 which consists of a box-like structure having a stepped bottom, as best shown in Fig. 2, and that is secured to a rock shaft 41, journaled in suitable bearings 42 and 43, the latter occupying a position forwardly of the vertical plane of the hinges 12. The shaft 41 has fastened to it adjacent the bearing 43 a worm gear 45 with which a worm 46 meshes, said worm being carried by a transverse shaft 47 that is journaled in bearings 48 and equipped at one or both ends with a crank or cranks 49. It is evident from the construction just described that by rotating the shaft 41 in one direction or the other, the cradle 40 may be rocked to the right or left, as the parts are viewed in Fig. 5. The plates 35 are normally supported upon side rails 50, and at their outer ends are turned downwardly, as shown at 51, to provide hand-holds to facilitate withdrawal of the plates, or hooked parts for engagement over the ends of the rails 50 on which said plates fulcrum when the cradle 40 is tilted, as will more clearly appear during the description of the operation of the apparatus. The side walls 20 of the body section 21 include removable panels 20a immediately above the plates 35. The spaces below the plates 35 are open at side and bottom, as revealed in Fig. 5, and the rear wall 31 has an opening below the panel 31c, as shown in Figs. 2 and 4.

Occupying a position within the base frame 10 of the dumping body section 11, and disposed centrally and longitudinally thereof adjacent the forward end of the frame, is a pressure fluid cylinder 55 that constitutes the power unit of the hoist. The cylinder is rigidly secured to the dumping body section, and operating within opposed guides 56 rearwardly of the cylinder, is a cross head 57 that is carried by the forward end of the rod 58 of a piston 59 that reciprocates within the cylinder. Operating fluid is conducted to and from the opposite ends of the cylinder by conduits designated 60 and 61 that desirably extend rearwardly to the region of the hinges 12 where they are provided with flexible joints or connections through which they communicate with conduits carried on the frame structure of the conveyance and leading to a pump, all of which is in accordance with common practice and therefore deemed unnecessary of illustration. Flexible elements or cables 65 are attached to the opposite ends of the cross head 57, and each is guided over sheaves 66 and 67 to the corresponding outer side of the dumping body section and thence rearwardly over a sheave 68, it being understood that all of the sheaves are mounted on and move with the dumping body section. The elements or cables 65 are led from the sheaves 68 upwardly and over the arcuate rails 26—being confined within the grooves 27 thereof—to where their rear ends are anchored in blocks 69 that are rigidly secured to the rear ends of said rails.

When it is desired to dump the load to the rear, the panels 31c and, if desired, the panel 31b, is or are removed, after which the plate 37 may be withdrawn. This plate may be readjusted in the cradle 40 to the position shown in broken lines in Fig. 2 so as to form a chute. Pressure fluid may now be delivered to the front end of the cylinder 55 to drive the piston 59 rearwardly—during which time fluid is withdrawn from the forward end of the cylinder that serves as a reservoir—thereby to move the piston and consequently the cross head 57 rearwardly. As the cross head so moves it will take in the flexible elements or cables 65 on the opposite sides of the conveyance and, inasmuch as the ends of the elements or cables opposite those fastened to the cross heads are fixed with respect to the so-called stationary section 21 of the body, the dumping body section 11 will be rocked on its hinges 12 to an elevated position, as indicated by the broken lines in Fig. 1. Thereupon, the load will be precipitated to the hopper-like bottom part of the body section 21 and will escape through the opening in the rear wall 31. After the load has been disposed of, the dumping body may be returned to its former position by reversing the flow of the operating fluid, as will be readily understood.

In case it is desired to dump the load to one side or the other—to the right, for example, as the parts are viewed in Figs. 4 and 5—the right hand plate 35 may be wholly or partly withdrawn, depending upon the size of the discharge opening that is wanted, and by means of the mechanism previously described the cradle 40 may be rocked to incline the platform constituted of the plate 37 toward the dumping side. The opposite plate 35, whose inner edge bears upon the top of the adjacent edge portion of the cradle, will swing to adjust itself to the new position of the cradle. If it is desired to carry the load to some point remote from the conveyance, the end of either a chute or apron conveyor may be disposed with its receiving end in position to receive the discharged load. As previously stated, the plate 35 on the side toward which the load is to be discharged may be partly or completely withdrawn and, in the latter instance, if a still larger discharge opening is desired, the adjacent panel 20ª may be removed. In situations where such would be advantageous, the removed plate 35 may be reversed and hooked over a rod (not shown) supported within apertures 75 and 76 located, respectively, in the rear wall 31, and in a wall section 77 forwardly thereof, such an arrangement of the plate being indicated by broken lines in Fig. 5.

Having thus described my invention, what I claim is:

1. In a dumping conveyance, a supporting structure, a load carrying body pivotally connected at its discharge end to said structure, hoisting means having operative connection with the structure but carried solely by and movable with the body for dumping it, and means incorporated in the conveyance, adjacent said discharge end of the body, adapted for adjustment whereby to direct the material constituting the load to any selected one of a plurality of load discharging directions.

2. In a dumping conveyance, a supporting structure, a load carrying body comprising a dumping section that is pivotally connected along its discharge end to said structure, and a section that is supported by and is stationary with respect to said structure, the side walls of the two sections having contiguous arcuate edges that are in substantially the same plane and are concentric to the pivotal axis of the dumping section, a hoist for operating the dumping section, and means incorporated in the lower portion of the stationary section adapted for adjustment so as to deliver the material constituting the load in any selected one of a plurality of predetermined load discharging directions.

3. In a dumping conveyance, a supporting structure, a load carrying body comprising a dumping section that is pivotally connected along its discharge end to said structure, and a section that is supported by and is stationary with respect to said structure, the side walls of the two sections having adjoining parts that are in substantially the same plane and are provided with contiguous arcuate edges that are concentric to the pivotal axis of the dumping section, means retaining said adjoining wall parts in approximately the same plane, a hoist for operating the dumping section, and means incorporated in the lower portion of the stationary section adapted for adjustment so as to deliver the material constituting the load in any selected one of a plurality of predetermined load discharging directions.

4. In a dumping conveyance, a supporting structure, a load carrying body pivotally connected adjacent its discharge end to said structure, guides on the body adjacent the sides thereof and spaced a substantial distance from the pivotal axis of the body, hoisting means beneath the body, opposed flexible elements connected thereto and engaged over said guides, and parts on the supporting structure above the maximum elevation of said guides to which the flexible elements are anchored.

5. In a dumping conveyance, a supporting structure, a load carrying body comprising a dumping section that is pivoted along its discharge end to said structure, and a section that is supported by said structure independently of the dumping section, guides on the dumping section adjacent the sides thereof and remote from the pivotal axis of said section, hoisting means carried by and beneath the dumping section, opposed flexible elements having one of their ends connected to said hoisting means and engaged over the aforesaid guides, and anchorage means fixed with respect to the second section above and beyond the range of movement of said guides to which the terminals of the flexible elements are secured.

6. In a dumping conveyance, a supporting structure, a load carrying body comprising a dumping section that is pivoted along its discharge end to said structure, and a section that is supported by said structure independently of the dumping section, the side walls of said sections having contiguous arcuate edges that are concentric to the pivotal axis of the dumping section, rails extending along the arcuate edges of the walls of the stationary section, guides on the dumping section in the vertical planes of said rails, a pressure fluid cylinder carried by and beneath the bottom of the dumping section and extending longitudinally thereof, a piston in the cylinder, a piston rod extending from the piston toward the pivoted end of the dumping section, a unit carried by the outer end of the piston rod, guides additional to those aforesaid supported by and beneath the dumping section, and flexible elements having one of their ends connected to said unit and engaging the guides, including the ones first mentioned by which said elements are disposed in the planes of the aforesaid rails, the elements bearing upon and extending along said rails, and anchorage means adjacent the ends of the rails remote from the guides to which the terminals of the flexible elements are secured.

7. In a dumping conveyance, a supporting structure, a load carrying body comprising a dumping section that is pivoted along its discharge end to said structure, and a section supported by and that is stationary with respect to the structure, the side walls of said sections having contiguous arcuate edges that are concentric to the pivotal axis of the dumping section, rails extending along the arcuate edges of the stationary section from their lower to their upper ends, flexible elements having their ends anchored adjacent the upper ends of the rails and extending along and bearing upon the rails to the region of the lower ends thereof, guides on the dumping section in the vertical planes of said rails and located adjacent the lower ends thereof when the dumping section is in its lowest position, and hoisting means wherewith said flexible elements have operative connection and by which said elements may be taken in thereby to cause the dumping section to be elevated.

8. In a dumping conveyance, a supporting structure, a load carrying body comprising a dumping section that is pivoted along its discharge end to said structure, and a section supported by and that is stationary with respect to the structure, the side walls of said sections having contiguous arcuate edges that are concentric to the pivotal axis of the dumping section, rails extending along the arcuate edges of the stationary section from their lower to their upper ends, flexible elements having their ends anchored adjacent the upper ends of the rails and extending along and bearing upon the rails to the region of the lower ends thereof, guides on the dumping section in the vertical planes of said rails and located adjacent the lower ends thereof when the dumping section is in its lowest position, and hoisting means carried by and beneath the dumping section wherewith said flexible elements have operative connection and by which said elements may be taken in thereby to cause the dumping section to be elevated.

9. In a dumping conveyance, a supporting structure, a load carrying body comprising a dumping section pivotally connected along its discharge end to said structure, and a second section carried by said structure independently of the dumping section and through which the load is adapted to be discharged, a hoist for operating the dumping section, the second section having discharge openings at the sides of its lower portion, a cradle supported within the lower central portion of the second section arranged to rock on an axis extending longitudinally of the conveyance, a shaft journaled in the supporting structure with its axis coincident with the former axis and to which the cradle is secured, means for rotating the shaft thereby to tilt the cradle, and means cooperating with the cradle to discharge the load through either of the discharge openings.

10. In a dumping conveyance, a supporting structure, a load carrying body comprising a dumping section pivotally connected along its discharge end to said structure, and a second section carried by said structure independently of the dumping section through which the load is adapted to be discharged, a hoist for operating the dumping section, the second section having lateral openings and a substantially central rear opening adjacent the bottom thereof, a cradle supported adjacent the rear opening to rock on an axis extending longitudinally of the conveyance, means for tilting the cradle, a top plate for the cradle that is adjustable from a position wherein it extends across the top of the cradle to a second position wherein it is inclined downwardly and rearwardly so as to direct the load through said rear opening, and plates extending inwardly from the sides of the second section to the cradle, said plates being individually adjustable to permit discharge of the load through the side opening toward which the cradle is tilted.

11. In a dumping conveyance, a supporting structure, a load carrying body comprising a dumping section pivoted along its discharge end to said structure, and a section supported by and that is stationary with respect to said structure, the lower portion of said stationary section depending a substantial distance below the bottom of the dumping section, a hoist for operating the dumping section, a cradle supported centrally within the lower portion of the stationary section for oscillation on an axis extending longitudinally of the body, said cradle incorporating a load sustaining top plate, plates bearing at their inner ends on the cradle adjacent the laterad edges thereof and being inclined upwardly and outwardly therefrom to where they are movably supported adjacent their outer ends by parts on the stationary section, each of said plates being retractable individually to provide a discharge opening for the load while the other plate is capable of adjusting itself to different angular positions of the cradle, and means for rocking the cradle in either direction.

IRA SCOTT MICK.